Figure 1:
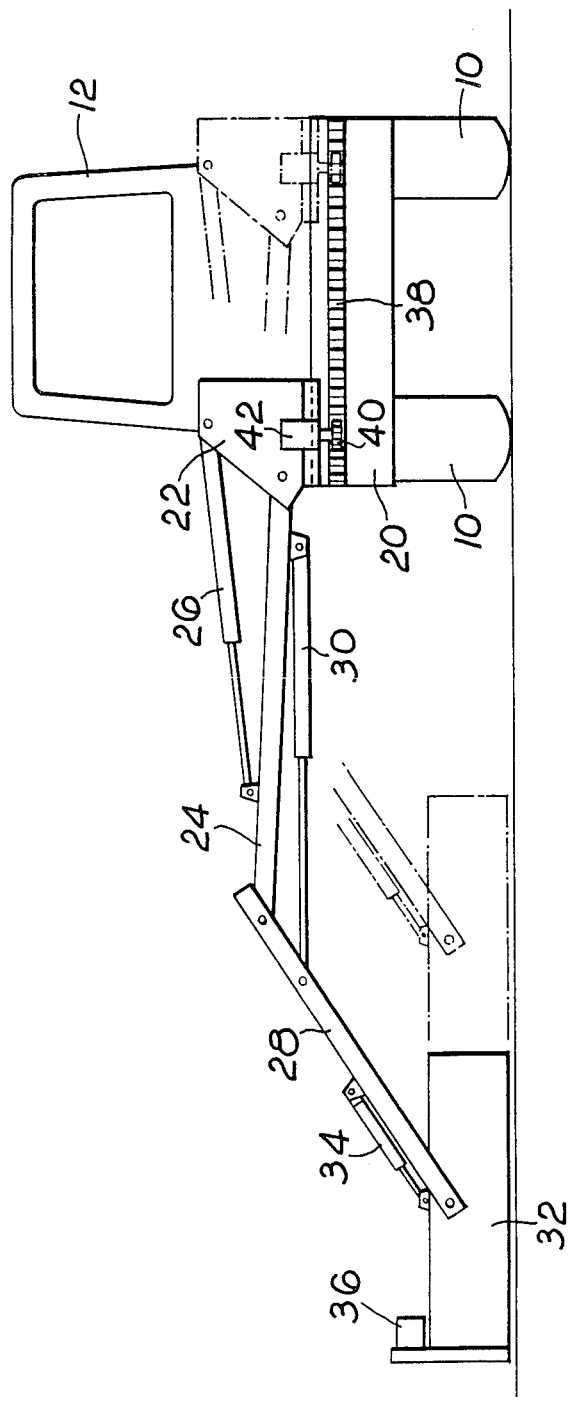

United States Patent [19]

Turner

[11] Patent Number: 4,873,818
[45] Date of Patent: Oct. 17, 1989

[54] LATERALLY ADJUSTABLE MOWER

[75] Inventor: Anthony L. Turner, Alcester, England

[73] Assignee: Turner International (Engineering) Limited, England

[21] Appl. No.: 163,195

[22] Filed: Feb. 25, 1988

Related U.S. Application Data

[63] Continuation of Ser. No. 853,431, Apr. 18, 1986, abandoned.

[51] Int. Cl.⁴ .................. A01D 34/64; A01D 35/28
[52] U.S. Cl. .................................. 56/10.8; 56/15.2; 56/15.3; 56/15.5; 56/15.8; 212/258
[58] Field of Search .................. 56/15.1, 15.2, 15.5, 56/17.1, 233, 237, 15.7–15.9, 10.4–10.9; 212/258, 141, 211

[56] References Cited

U.S. PATENT DOCUMENTS

| 1,242,505 | 10/1917 | Wise | 56/15.5 |
| 3,241,302 | 3/1966 | Barry | 56/15.2 |
| 3,462,925 | 8/1969 | Lanier | 56/15.7 |
| 3,949,539 | 4/1976 | Cartner | 56/15.5 |
| 4,426,829 | 1/1984 | Johnson | 56/15.5 |
| 4,432,192 | 2/1984 | Maier et al. | 56/15.7 |
| 4,502,269 | 3/1985 | Cartner | 56/15.5 |

FOREIGN PATENT DOCUMENTS

| 2622770 | 12/1977 | Fed. Rep. of Germany | 56/15.5 |
| 1076752 | 7/1967 | United Kingdom . | |
| 1541693 | 3/1979 | United Kingdom . | |
| 2115668 | 9/1983 | United Kingdom . | |

Primary Examiner—Bruce M. Kisliuk
Attorney, Agent, or Firm—Learman & McCulloch

[57] ABSTRACT

A mower has a system of levers carrying the cutting head to project it laterally of the tractor on which it is mounted, the actual mounting for the levers being adjustable along the length of a beam extending across the tractor while the tractor is in motion, by means of a motor driving a rack and pinion on the mounting and beam respectively.

5 Claims, 4 Drawing Sheets

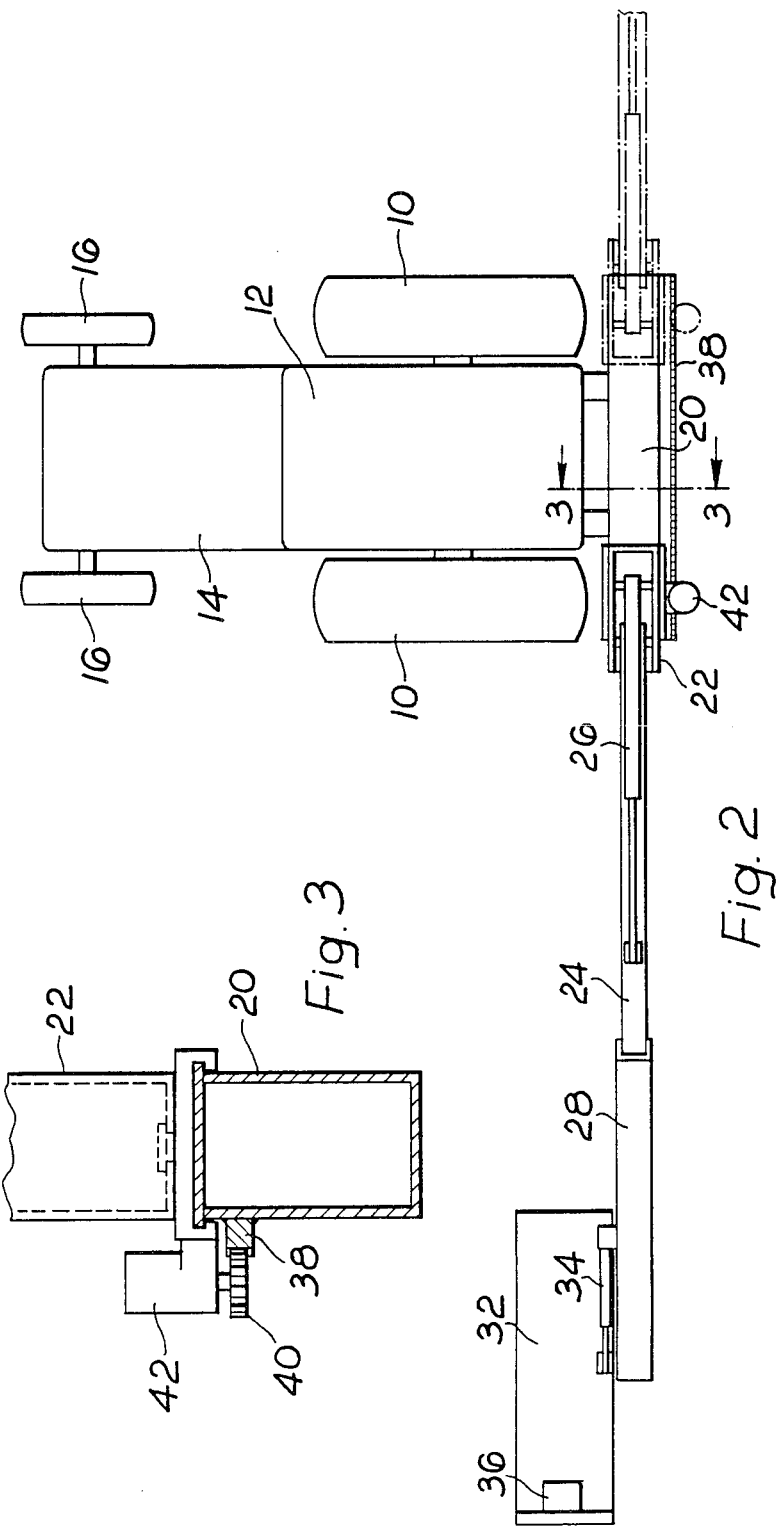

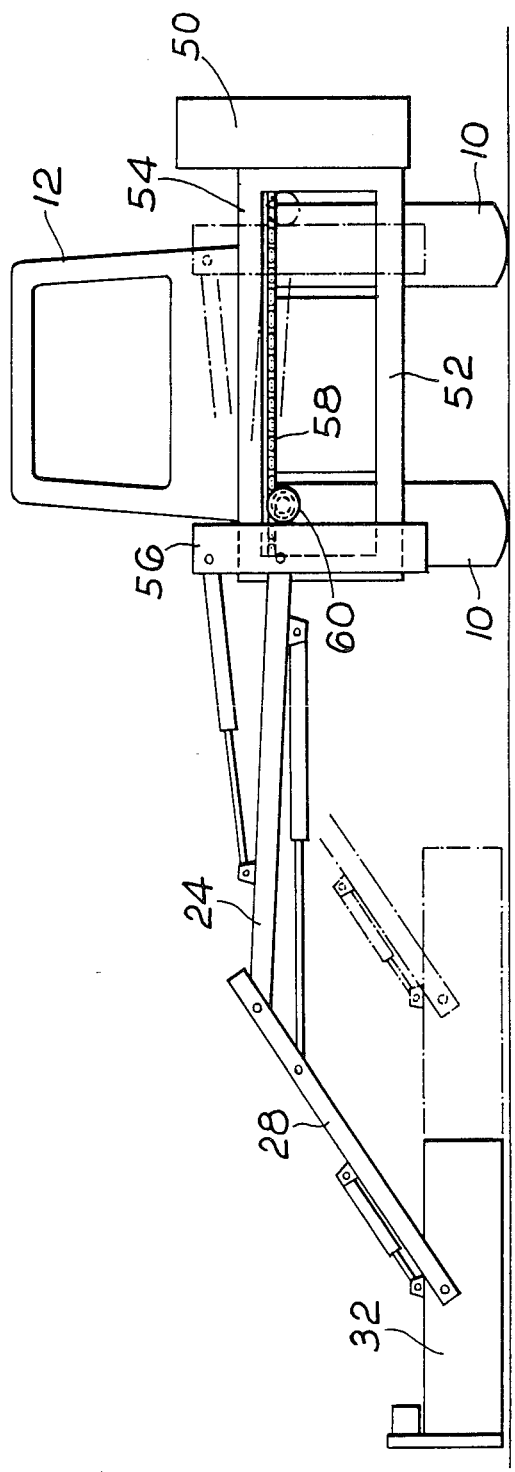

LATERALLY ADJUSTABLE MOWER

This is a continuation of co-pending application Ser. No. 853,431 filed on Apr. 18, 1986 now abandoned.

This invention relates to mowers of the kind comprising a cutting head mounted on one end of a system of levers which is mounted at the other end on a tractor, with a series of hydraulic rams or the like for controlling the relative angles of the parts. By these means, as well known, the tractor may drive slowly along a road whilst the head is used to cut vegetation at the verge or trim the top or side of a hedge.

The designer of such equipment may be concerned to provide the maximum possible reach, to enable verges some distance from the tractor to be satisfactorily cut. Usually, equipment having a long reach is incapable of use particularly close to the tractor, and thus could not be used to "side" a hedge in a narrow lane.

Prior Patent GB-No. 1 541 693 proposes a ditcher, which according to the Patent can be converted into a mower by replacing the ditching head with a cutting head, where the system of arms is mounted on a turntable which is disposed at one side of the tractor midpoint. According to this Patent, the frame which supports the turntable can be arranged to be extended out from the tractor to increase the reach. A support leg is provided for engagement with the ground to take the cantilevered load at such an extended position. This arrangement can give a greater reach, but does not improve the possibility when mowing close up to the tractor, and moreover is of no value in the extended position if mowing to be accomplished whilst the vehicle (tractor) moves, because of the impossibility of using the support legs when the tractor is moving.

Prior Patent GB-No. 1 076 752 shows a back-hoe, that is to say a digging bucket carried at the end of a system of levers with hydraulic rams for controlling the relative angles of the parts, and which extends generally rearwardly of the tractor so as to be used for digging a ditch which extends in generally the same direction as that in which the tractor moves although in fact the digging operation is performed whilst the tractor is stationary again using leg supports whilst the digging operation is carried out. This Patent describes slewing means for swinging the bucket from side-to-side including the possibility of it extending laterally of the tractor, so that the pivot about which the slewing occurs is at the same side of the tractor as that to which the system of arms extends, Figure 2 of the drawings of that prior Patent shows this. The actual slewing operation is carried out by engaging the bucket with the ground and then operating the slewing rams. Hence it is impossible to effect slewing whilst the vehicle is travelling, even if this were required.

Our own prior Patent GB-No. 2 115 668- A is concerned with mowers of the same kind as the present invention and proposes to make the mounting for the system of levers adjustable laterally of the vehicle, and in particular suggests that the mounting may comprise a beam extending laterally of the tractor, and a bracket clamped to the beam at any of a range of positions along its length, the system of levers being pivoted to the bracket. We have also suggested that the beam is utilised as a hydraulic reservoir or as a power pack, or as both, and is located at the rear of the tractor. Again, in this construction also, it is necessary to stop the vehicle when any adjustment is to be effected.

The present invention is based on the realisation that substantial advantage can be attained by making the adjustability of the mounting bracket possible whilst the tractor is actually moving. Thus, not only can the advantage of the maximum reach and the ability to work particularly close to the tractor be provided as in Patent No. GB-No. 2115668A but also, satisfactory cutting can be achieved even when the tractor has to manoeuvre around obstacles.

Thus for example, if a tractor fitted with a rear mounted laterally extending beam system is being used at a particular reach or extension, and the tractor has to swerve away from the position being cut in order to avoid an obstacle in the road, the effect (because of the rear mounted position of the mower) is to swing the cutting head further beyond from the original line, i.e. increase the reach momentarily. If a hedge were being sided, a gap could be cut into or even through the hedge as a result. By providing adjustability of the mounting point during motion, this can be compensated for and a much better mowing or like cutting operation achieved in much faster time.

According to the invention a mower comprising a cutting head pivoted to one end of a system of levers of which the other end is pivoted to a mounting on a tractor, with a series of fluid power cylinders for adjusting the angles of the parts relative to one another and hence the reach, in which the mounting is located on a beam extending laterally of the tractor, the mounting being adjustable along the length of the beam, is characterised in that power means are provided for moving the mounting along the beam whilst the tractor is in motion and without it being necessary to engage any part of the system of levers or cutting head with the ground, and the arrangement being such that the levers may extend laterally to one side of the tractor when the mounting is at the end of the beam most remote from that side of the tractor.

Two possibilities exist: the mounting may include a pivot by means of which the whole system of arms can be swung for example through 180° from one side of the tractor to the opposite side of the tractor and the beam may extend without any impediment across the tractor, and in this case the arrangement can be used for either righthand cutting or lefthand cutting whilst the tractor is travelling in one direction. By positioning the mounting towards the end of the beam beyond which the system of levers project, maximum reach will be afforded. By positioning the mounting towards the end of the beam opposite from that at which the system of levers project, minimum reach will be provided most suitable for cutting very close to the tractor: especially siding a hedge in a narrow lane. In such an arrangement, the beam may comprise the hydraulic reservoir.

In an alternative arrangement, the hydraulic reservoir may be provided at one end of the beam, and in this case the pivot between the mounting and the system of levers can be omitted so that the arrangement is effectively designed for lefthand operation, or for righthand operation (according to which side of the beam is provided with the hydraulic reservoir) but not both. It will be appreciated that when the mounting is moved along the beam towards the hydraulic reservoir, the arrangement is in the position most suitable for cutting very close to the tractor, and when the mounting is most remote from the hydraulic reservoir the maximum reach position is provided.

The power means for moving the mounting may comprise a hydraulic motor provided on the mounting itself and arranged to drive a sprocket engaged with a chain fixed along the length of the beam. This is particularly convenient since all of the other movements of the mower, that is to say the individual fluid power cylinders adjusting the angles of the levers relative to one another and also the drive for the cutting head itself may also be hydraulic all being supplied from a suitable pump driven for example from a power takeoff shaft of the tractor. However, other drivig means are possible, including an electric motor especially one connected in the same way to drive a pinion along a rack.

It will be appreciated that in the arrangement of the present invention no clamp is necessary during normal operation, although one may be provided to prevent unintentional movement of the mounting on the beam at times when the hydraulics are not powered, for parking safety.

Figure 5:
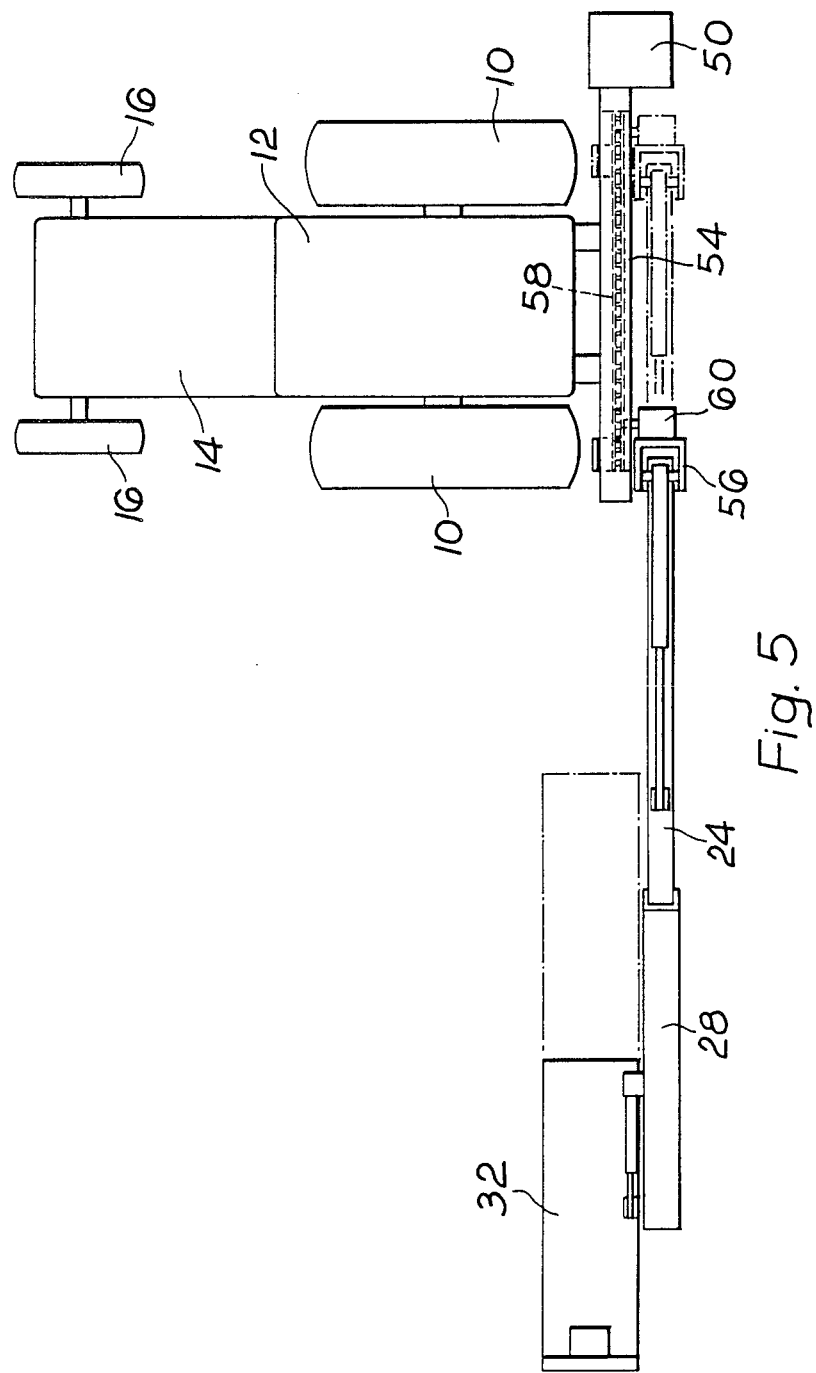

Two embodiments of the invention are described with reference to the accompanying drawings in which:

FIG. 1 is a rear elevation of a first embodiment;
FIG. 2 is a plan view of the same;
FIG. 3 is an enlarged sectional elevation on line 3—3 of FIG. 2;
FIG. 4 is a view similar to FIG. 1 showing a second embodiment; and
FIG. 5 is a view similar to FIG. 2 but of the second embodiment.

Referring to the drawings and in particular FIG. 1, the tractor which is somewhat diagrammatically illustrated comprises large rear driving wheels 10 and a cab 12, an engine compartment 14 and front wheels 16.

At the rear of the tractor is a powerpack and hydraulic tank formed as a generally beam-like support or box 20 extending athwart or transversely of the tractor from side to side thereof and substantially over the length equal to the axle length of the rear wheels. The top of the box 20 forms a platform which supports a bracket 22 forming a mounting for a system of elongate levers carrying the mowing head. First lever 24 is pivoted to the bracket and its angular position, in general meaning whether it extends horizontally from the bracket or upwardly from the bracket, is controlled by a first hydraulic ram 26. Second lever 28 is pivoted to the end of lever 24 and in general may extend downwardly therefrom or relatively horizontal. The angle between the two levers is controlled by second ram 30. The cutting head 32 may comprise a flail and mower assembly pivoted to the end of the lever 28 with the angle controlled by a ram 34. The mower shaft carrying the cutters is driven by hydraulic motor 36. All of the rams and the hydraulic motor are connected by appropriate flexible hoses to the powerpack and to controls operated by the driver.

FIG. 3 shows a simple sliding connection between the mounting bracket 22 and the box-beam 20, and it will be appreciated that in practice appropriate low friction devices such as roller bearings and the like may be disposed between the parts to give smooth and easy movement of the mounting bracket on the box-beam along a path from one side of the tractor to the other.

Driving means for driving the mounting bracket 22 comprises a rack 38 is provided on the face of the box-beam and a pinion 40 driven by a further hydraulic motor 42 is meshed with that rack, the motor being carried on the bracket and similarly connected by hydraulic hoses to the powerpack and with a control for driver operation.

The chain-dot lines in FIG. 1 show the bracket adjusted as far as possible to the right in the figure, and then by appropriate angling of the arms 26, the mower can cut particularly close to the tractor, indeed possibly it can cut vertically below the box-beam itself. In the position shown in full lines, maximum reach is afforded.

Stops may be provided to prevent over-travel and a simple lock system such as a pin and detent to fix the mounting bracket in a predetermined position for parking.

In the variation shown in FIGS. 4 and 5, the hydraulic powerpack and tank 50 extends at one end of a pair of parallel beams 52 54 which guide the bracket 56, and the rack is formed by a length of roller chain 58 stretched along one of the beams and fixed thereto, with a sprocket 60 driven by the motor attached to the mounting 56, to like effect.

In the FIG. 1 to 3 version, the mounting bracket could be positioned so that the levers project to the left or right, and FIG. 2 shows the two alternatives so that in the full line position of FIG. 2 the mower is arranged for cutting on the lefthand side of the tractor and in the chain-dot lines, for mowing on the righthand side of the tractor. The FIGS. 4 and 5 version is not so adapted, and in this case both sides of a road will be mown by driving the tractor first in the one direction and then in the other direction.

In each of the two disclosed embodiments of the invention the cutting head may be extended a maximum distance from one side of the tractor, and such distance is determined by the extension of the levers and by the length of the path that the bracket can be moved along the support beam. The maximum distance that the cutting head may be retracted toward the one side of the vehicle is determined by the extent that the levers may be contracted and by the distance that the bracket can be moved along the transverse path toward the opposite side of the vehicle.

HAVING NOW DESCRIBED MY INVENTION WHAT I CLAIM IS:

1. A mobile mower comprising a vehicle having a length dimension and a width dimension; a cutting head; a mounting bracket having length and width dimensions each of which is substantially less than the width dimension of said vehicle; extensible and retractable articulated linkage means interposed between said cutting head and said bracket; means securing one end of said articulated linkage means to said cutting head; means securing the opposite end of said articulated linkage means to said bracket; power means for extending and retracting said articulated linkage means to enable said cutting head to be moved toward and away from said bracket; a support beam secured to said vehicle and extending from side to side of said vehicle; means mounting said bracket directly on said beam for movements to and fro along a path from either side of said vehicle to the other side thereof, said path having a length dimension corresponding substantially to the width dimension of said vehicle; and reversible power drive means for driving said bracket in a selected one of two opposite directions along said path regardless of whether said vehicle is moving or stationary, thereby enabling said cutting head to be moved to and from any selected position on said path between a maximum extended position relative to one side of said vehicle and a maximum retracted position closely adjacent said one side of said vehicle, said maximum positions being determined in part by the length dimension of said path and the position of said bracket on said path, said drive means when inactive being operable to maintain said bracket in said selected position.

2. A mobile mower according to claim 1 wherein the mounting means for said bracket is reversible on said beam thereby enabling said cutting head to occupy a position on either side of said vehicle.

3. A mobile mower according to claim 1 wherein said drive means comprises a gear mechanism.

4. A mobile mower according to claim 1 wherein said drive means comprises a chain and sprocket mechanism.

5. A mobile mower according to claim 1 wherein said beam is supported on said vehicle adjacent one end thereof.

* * * * *